United States Patent [19]

Eagan, Sr.

[11] 4,261,218
[45] Apr. 14, 1981

[54] SPEED REDUCER ADJUSTMENT MEANS

[76] Inventor: Joseph A. Eagan, Sr., 539 Ford St., West Conshohocken, Pa. 19428

[21] Appl. No.: 972,664

[22] Filed: Dec. 26, 1978

[51] Int. Cl.³ .............................................. F16H 55/18
[52] U.S. Cl. ...................................... 74/409; 74/427; 74/440
[58] Field of Search .................. 74/425, 427, 409, 440, 74/441

[56] References Cited

U.S. PATENT DOCUMENTS

| | | | |
|---|---|---|---|
| 353,429 | 11/1886 | Reynolds | 74/425 |
| 445,144 | 1/1891 | Hunter | 74/425 X |
| 2,341,968 | 2/1944 | West | 74/427 X |
| 2,536,920 | 1/1951 | Ducanis | 74/425 |
| 2,583,140 | 1/1952 | Else | 74/801 |
| 2,586,293 | 2/1952 | Birkigt | 74/425 |
| 2,935,885 | 5/1960 | Saari | 74/425 |
| 3,665,786 | 5/1972 | Kobayashi | 74/625 |

FOREIGN PATENT DOCUMENTS

| | | | |
|---|---|---|---|
| 2108508 | 9/1971 | Fed. Rep. of Germany | 74/425 |
| 1371625 | 10/1974 | United Kingdom | 74/425 |

*Primary Examiner*—C. J. Husar
*Assistant Examiner*—Conrad Berman
*Attorney, Agent, or Firm*—Weiser, Stapler & Spivak

[57] ABSTRACT

A speed reducer comprising a worm gear of the type suitable for driving proportioning pumps. The worm is rotated by an input shaft which is suitably journalled within a speed reducer housing wherein the input shaft bearings are respectively carried within aligned housing openings. Either one of the input shaft bearings is adjustable by means of a threaded hole in the housing where the input shaft is inserted. A threaded adjusting piece is screwed against the race of one of the bearings that hold the input shaft to precisely adjust the longitudinal alignment of the worm relative to the gear and to precisely load the two bearings that hold the input shaft to substantially eliminate excessive wear, vibration and chatter.

3 Claims, 2 Drawing Figures

SPEED REDUCER ADJUSTMENT MEANS

BACKGROUND OF THE INVENTION

The present invention relates generally to speed reducers especially suitable for use with proportioning pumps and more particularly is directed to a threaded, precise adjustment suitable to substantially eliminate backlash in a worm gear speed reducing drive.

In the field of proportioning pumps and metering pumps, it is now the common practice to provide a motor driven input shaft to drive a speed reducing system which is generally fabricated of the single enveloping worm gear or double enveloping worm gear type. Exemplary of such pumps are the proportioning pumps manufactured and sold by Jaeco Pump Company, West Conshohocken, Pa., 19428 under the designation or style "Jaecopak" and "Jaecofram". The Jaeco Pump Company pumps are suitable for heavy duty metering and comprise essentially a speed reducer of the single enveloping worm gear type which receives input power from an electric motor. Output power is transferred from the input shaft to an output shaft through meshing gear which is conventionally driven by the worm which is affixed to the input shaft. The speed reducer housing of the proportioning pump of the type described is equipped with an open end cap through which the input shaft is rotatively carried through a conventional oil seal. Suitable bearings are positioned interiorly of the speed reducer housing and may be secured to the gear reducer housing by the use of a sleeve in one end and a screwed adjustor on the other end to rotatively carry the input shaft in a manner compensating for backlash, vibration, chatter and thrust loads.

The prior art of proportioning pumps have included gaskets or shims which were installed intermediate one or both end caps and the housing to facilitate adjustment and alignment of the gear relative to the worm by precisely positioning the axial alignment of the input shaft relative to the speed reducer housing. In view of the general type service characteristic of proportioning pumps, wherein one or a pair of pistons or diaphragms are reciprocated by the output shaft, reciprocating or cyclical loads are imposed upon the system. Substantially zero backlash between the worm and gear was absolutely necessary because of the reciprocating nature of the load to prevent accelerated wear or other damage to the gears.

Due to the critical nature of the worm and gear alignment, consideration to prevent backlash caused by the reciprocating load had to be given. Various shims or gaskets of different thicknesses had to be provided for end cap and bearing adjustment purposes to thereby move the worm relative to the gear for optimum meshing without backlash. These adjustments were highly precise and critical and required skilled workers and substantial time to accomplish the desired purpose.

SUMMARY OF THE INVENTION

The present invention relates generally to speed inducer drives particularly suitable but not limited to piston proportioning pumps, and more particularly, is directed to an adjustment to minimize or eliminate backlash between the worm and the gear.

The speed reducer of the present invention comprises generally a conventional housing defining an interior space within which the worm and gear of a speed reducer drive can rotate and mesh to transmit power from the input shaft to the output shaft which shafts are oriented at right angles to each other. The housing includes pairs of aligned openings suitable to receive and journal, respectively, within pairs of bearings the input shaft and the output shaft therewithin. One input shaft opening and one or both of the output shaft openings are suitably sealed using open end caps and conventional oil seals. The output shaft can consist of only one output side and the other end of the output shaft would be closed internally by use of a side cap with no hole or seal.

Either one of the input shaft bearings can be adjustable by means of a threaded hole in the casting where the input shaft is inserted. Into the threaded part of this hole is inserted a threaded adjusting piece, which is screwed against the race of one of the two tapered bearings that hold the input shaft. This precisely adjusts the longitudinal alignment of the worm relative to the gear and also precisely loads the two bearings that hold the input shaft so excessive wear, vibration and chatter are eliminated. Further adjustment at any period during the life of the gear reducer is a simple achievement by removing the associated end cap and inserting an adjusting wrench into the screwed adjustor. The use of the screwed adjustor eliminates the necessity of various sizes of gaskets or shims between the end cap and the gear reducer housing on either end. Consequently, this removes the human error, which is very often the cause of gear reducer failure.

By precisely aligning the worm with the gear, substantially zero backlash can be achieved whereby the reciprocating load imposed by the reciprocation of the piston pumps will be entirely compensated by the precise gear teeth alignment to thus prevent backlash, chatter, wear or other undesirable operating characteristics. The threaded adjusting piece permits precise adjustment of the worm to optimumly align the worm relative to the gear without resorting to the former method of adjusting the relative position of an end cap by utilizing a plurality of various sized gaskets of shims and numerous manual operations to find the optimum position of alignment in this manner.

It is therefore an object of the present invention to provide novel adjustment means for a speed reducer wherein the alignment of a worm and gear can be accomplished without the use of shims or gaskets of varying thicknesses.

It is another object of the present invention to provide a novel adjustment for speed reducers comprising a threaded input shaft opening in the speed reducer housing and a cooperating threaded insert whereby longitudinal alignment of the input shaft can be precisely controlled by threadedly adjusting the position of the end cap in the housing.

It is another object of the present invention to provide a novel adjustment means for a speed reducer of the worm gear type included threaded means to longitudinally adjust the input shaft within the speed reducer housing to achieve substantially zero backlash between the worm and the gear.

It is another object of the present invention to provide a novel adjustment means for a worm gear speed reducer comprising a housing having an input shaft opening, threaded means provided in the opening for input shaft longitudinal adjustment purposes, said threaded means comprising a threaded hole in the casting and a threaded adjusting piece whereby the longitudinal alignment of the input shaft can be precisely adjusted by turning the threaded adjusting piece relative to the threaded hole in the casting.

It is another object of the present invention to provide a novel adjustment for speed reducer that is simple in design, inexpensive in manufacture and trouble free when in use.

Other objects and a fuller understanding of the invention will be had by referring to the following description and claims of a preferred embodiment, thereof, taken in conjunction with the accompanying drawings, wherein like reference characters refer to similar parts throughout and in which:

DESCRIPTION OF THE PREFERRED EMBODIMENT OF THE INVENTION

Figure 1:
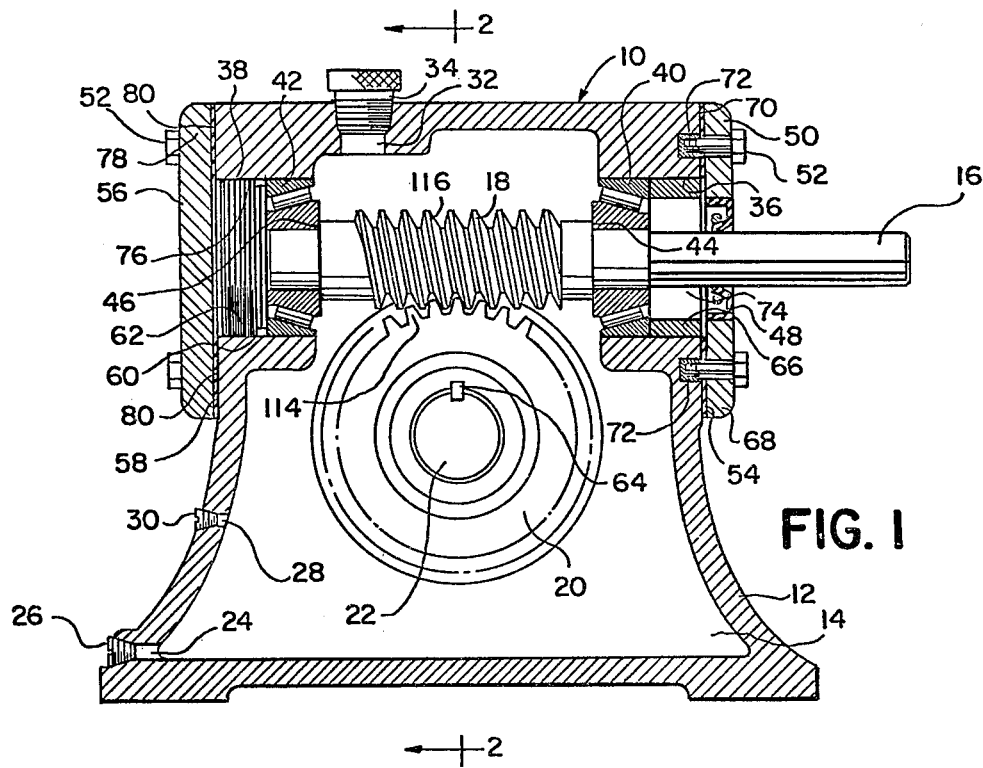
FIG. 1 is a cross sectional view of a speed reducer including a shaft adjustment means.

Although specific terms are used in the following description for the sake of clarity, these terms are intended to refer only to the particular structure of the invention selected for illustration in the drawings and are not intended to define or limit the scope of the invention.

Figure 2:
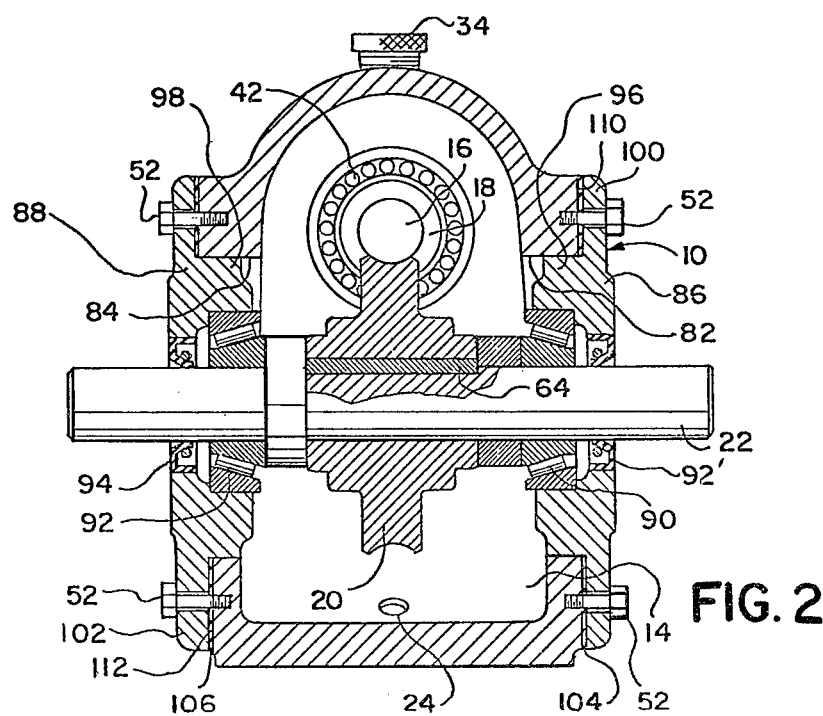
FIG. 2 is a cross sectional view taken along Line 2—2 of FIG. 1, looking in the direction of the arrows.

Referring now to the drawings, there is illustrated in FIGS. 1 and 2 a speed reducer generally designated 10 comprising a housing 12 which defines an interior gear space 14. The housing 12 conventionally comprises a pair of spaced, aligned input shaft openings 36, 38 and a pair of spaced, aligned output shaft openings 82, 84. In accordance with usual worm gear construction practice, the input shaft 16 and the output shaft 22 are non-intersecting shafts making an angle of ninety degrees with each other. As illustrated, the input shaft 16 aligns within the input openings 36, 38 and the output shaft 22 is aligned within the housing output shaft openings 82, 84. In accordance with the usual practice, the gear space 14 is partially filled with lubricating oil (not shown) and the housing 12 conventionally can be provided with an oil level opening 28 which opening is removably closed by the threaded oil level plug 30. Similarly, the housing side wall is provided with a bottom positioned drain opening 24 which is conventionally closed by a threaded drain plug 26. At the top of the housing 12 is positioned a breather opening 32 within which a breather plug 34 is threadedly engaged, in a known manner.

Referring now to FIG. 1, it will be noted that the input shaft is journalled within the right and left input shaft bearings 40, 42, which bearings conventionally facilitate rotation of the input shaft 16 and further compensate for a thrust load in known manner. The outer races of the bearings 40, 42 mount within the input shaft openings 36, 38 and have their inner races positioned respectively against the right and left shaft shoulders 44, 46 in a manner to prevent longitudinal or axial movment of the input shaft 16 when the parts are fully adjusted.

The right housing opening 36 may be formed with straight sidewalls within which a sleeve 66 is a sliding fit. The sleeve 66 is interposed between outer race of the bearing 40 and the end cap 50. Preferably, a gasket 54 of known composition is provided between the end cap 50 and the flat smooth face 70 of the housing 12 in well known manner. A plurality of bolts 52 may be provided through the end cap flange 68 to threadedly engage within the threaded recesses 72 formed in the housing 12 to provide a secure construction. Thus, by tightening the bolts 52 within the threaded recesses 72, the open end cap 50 can be readily secured against the housing. It will be noted that the interior periphery of the sleeve 66 abuts the outer race of the bearing 40 to thereby prevent outward movement of the bearing 40 relative to the shaft 16. Also, as above set forth, the inner bearing race abuts the shaft shoulder 44 whereby the end cap 50 serves to lock the shaft 16 and the affixed worm 18 in a desired longitudinally aligned position by utilizing the threaded bolts 52. An oil seal 48 of conventional design radially extends from the periphery of the shaft 16 toward the end cap flange 68 in well known manner to seal the inner opening 74 which is defined by the open end cap 50.

The opposite, spaced input shaft opening 38 is preferably machined or otherwise formed with internal threads 60 to threadedly receive the external threads 62 which are provided on the threaded adjuster 76. Still referring to FIG. 1, it will be noted that the inner periphery of the threaded adjuster 76 abuts the outer race of the left input shaft bearing 42 in a manner to axially inwardly urge the bearing 42 when the adjuster is turned about the threads 60 for shaft adjustment purposes. The inner race of the bearing 42 abuts the input shaft shoulder 46 in a manner to prevent axial movement of the shaft 16 relative to the housing 12. The closed end cap 56 comprises a radially extending flange 78 which is pressed against the flat, smooth face 80 which is machined in the housing exterior about the input shaft opening 38. In conventional manner, a gasket 58 may be interposed between the inner surface of the end cap flange 78 and the machined flat face 80 to prevent leakage thereabout. Accordingly, as the threaded adjuster 76 is threadedly turned about the interior threaded section 60 provided in the left input shaft opening 38, the inner periphery of the adjuster 76 is urged into contact with the left input shaft bearing. As above set forth, the bearing 42 also positions against the input shaft shoulder 46 whereby precise axial adjustment of the input shaft 16 can be made by turning the adjuster relative to the housing 12.

The output shaft 22 makes an angle of ninety degrees with the input shaft 16 and is rotatively positioned within the output shaft openings 82, 84 which are formed in the speed reducer housing 12. As illustrated in FIG. 2, each of the output shaft openings 82, 84 is respectively closed by an open end cap 86, 88 through which the output shaft 22 is rotatively carried. Each end cap 86, 88 comprises a central hub 96, 98 which is a press, sliding fit within a respective output shaft openings 82, 84. A flange 100, 102 extends radially outwardly from its respective hub 96, 98 and seals against a respective machined, flat face 110, 112. Bolts 52 threadedly engage into recesses provided in the housing body to secure the respective flanges 100, 102 of the output shaft end caps 86, 88 in position.

Still referring to FIG. 2, it will be noted that the right and left end output shaft bearings 90, 92 are carried by the end caps 86, 88 to facilitate rotation of the output shaft 22 therewithin. The gear 20 is secured to the output shaft 22 in conventional manner, such as by employing a key 64 to thereby transfer through ninety degrees rotary motion from the worm 18 to the output shaft 22 in well known manner.

To complete the construction, gaskets 104, 106 may be employed between the respective right and left flanges 100, 102 of the left and right end caps 86, 88 in the usual manner. Also, suitable oil seals 92', 94 may be employed between the outer periphery of the output shaft 22 and the inner periphery of the openings provided through the end caps 86, 88 in a known manner.

As illustrated in the drawings, the teeth of the worm 18 mesh with the teeth of the gear 20 to transmit rotative energy from the input shaft 16 to the output shaft 22 in a manner to obtain large speed reduction between the respective shafts 16, 22. As above set forth, the shaft 22 can be connected in conventional manner to function reciprocating equipment, such as piston pumps by connecting a conventional eccentric, connecting rod and piston, (all not shown) in a well known manner. The reciprocating load or loads imposed upon the output shaft 22 will be transmitted to the teeth 114 of the gear 20 and the teeth 116 of the worm 18. Because of the reciprocating nature of the load, it is of utmost importance that the respective gear teeth 114, 116 be so adjusted, so aligned and so matched as to substantially prevent backlash therebetween.

The adjustment can be speedily made in accordance with the present invention by turning the threaded adjuster 76 within the input shaft opening 38 by threadedly turning the adjuster threads 62 relative to the housing interior threads 60. Clockwise or counterclockwise rotation of the adjuster will cause corresponding inward or outward axial movement of the adjuster 76. The inner periphery of the adjuster 76 bears against the race of the left bearing 42 which, in turn, bears against the shoulder 46 of the input shaft 16. Accordingly, the parts may be speedily adjusted for optimum alignment of the respective teeth 114, 116 to prevent backlash therebetween by the rotative movement of the adjuster 76 within the threaded opening 38. The gaskets 54, 58 of the respective end caps 50, 56 may be adjusted in thickness as necessary to assure optimum gear alignment.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a speed reducer of the type including a housing having first and second input shaft openings and output shaft openings, first and second input shaft bearings including inner and outer races and supported within the housing at the input shaft openings, an input shaft journalled within the input shaft bearings to rotate a worm, the input shaft having respective first and second shaft shoulders, output shaft bearings supported within the housing at the output shaft openings, an output shaft journalled within the output shaft bearings in a manner to be rotated by an affixed gear which meshes with the worm, the improvement which comprises an end cap having an opening receiving the input shaft therethrough and partially closing the first one of said input shaft openings about the input shaft, said open end cap having a first oil seal radially extending from the input shaft to effect oil sealing about the input shaft;

an unthreaded sleeve positioned in the first input shaft opening and extending between and contacting the end cap and the outer race of the first input shaft bearing, the inner race of the first bearing contacting the first shaft shoulder;

a closed end cap closing the second of said input shaft openings, threaded means adjustable relative to the housing and bearing against the outer race of the second input shaft bearing to effect axial adjustment of the input shaft; and wherein the inner race of the second input shaft bearing bears against the second shaft shoulder.

2. The speed reducer of claim 1 wherein the threaded means comprises an interior thread formed in the second input shaft opening and wherein the closed end cap overfits and covers the threaded means.

3. The speed reducer of claim 2 wherein the threaded means further comprises an adjuster provided with external threads of size and pitch to threadedly engage the interior thread to axially adjust the input shaft relative to the housing and wherein a gasket is interposed between the closed end cap and the housing.

* * * * *